United States Patent [19]

Harnden, Jr. et al.

[11] 4,070,701

[45] Jan. 24, 1978

[54] INVERTER POWER SUPPLY

[75] Inventors: John D. Harnden, Jr.; William P. Kornrumpf; John P. Walden; Loren H. Walker, all of Schenectady, N.Y.

[73] Assignee: General Electric Company, Schenectady, N.Y.

[21] Appl. No.: 657,384

[22] Filed: Feb. 11, 1976

Related U.S. Application Data

[63] Continuation of Ser. No. 516,789, Oct. 21, 1974, abandoned.

[51] Int. Cl.² .......................................... H02M 3/335
[52] U.S. Cl. ...................................... 363/25; 363/80; 363/97; 363/134
[58] Field of Search .................... 321/2, 11, 14, 18, 19, 321/45 R; 363/24, 25, 55, 56, 80, 97, 134

[56] References Cited

U.S. PATENT DOCUMENTS

| | | | |
|---|---|---|---|
| 3,059,164 | 10/1962 | Johnson | 321/11 X |
| 3,192,464 | 6/1965 | Johnson et al. | 321/2 |
| 3,234,450 | 2/1966 | Jennings | 321/2 |
| 3,383,582 | 5/1968 | Bishop et al. | 321/18 |
| 3,657,631 | 4/1972 | Martens et al. | 321/18 X |
| 3,702,434 | 11/1972 | Ryan | 321/2 X |
| 3,743,920 | 7/1973 | Ubillos | 321/2 |
| 3,843,919 | 10/1974 | Yamamura et al. | 321/45 R |

Primary Examiner—William M. Shoop
Attorney, Agent, or Firm—Stephen B. Salai; Joseph T. Cohen; Jerome C. Squillaro

[57] ABSTRACT

A high frequency inverter power supply includes a high power inverter section powered by substantially unfiltered rectified a.c., and a control section including rectifier and filter means for providing substantially pure d.c. to maintain continuous instantaneous control over the high power inverter section. High frequency transformer means and optional output rectifiers and filters provide for a.c. or d.c. output.

32 Claims, 16 Drawing Figures

INVERTER POWER SUPPLY

This is a continuation, of application Ser. No. 516,789, filed Oct. 21, 1974, and now abandoned.

This invention relates, in general, to inverter power supplies and, more particularly, to a class of inverter power supplies for converting a low frequency a.c. input to either a high frequency regulated a.c. output or a regulated d.c. output.

The use of inverters for the conversion of a d.c. electrical input to an a.c. electrical output has long been known in the art. Early embodiments included the use of electro-mechanical vibrators for the conversion of d.c. to a.c. and transformer means for converting the generated a.c. to the desired voltage level. More recently, solid state switching devices have been increasingly utilized in conjunction with high frequency transformers for the conversion of a d.c. electrical input of an a.c. electrical output. The advantages which may be realized through the use of high frequency magnetics as opposed to low frequency as, for example, 50 or 60 cycle line frequency magnetics are also well known. It is not unusual that size and weight savings approaching 85 percent be achieved. An example of recent developments in the area of d.c. to a.c. inverters may be found in a co-pending commonly assigned application of John P. Walden entitled "D.C. to A.C. Inverter Having Improved Switching Efficiency, Overload and Thermal Protection Features" and filed concurrently herewith. The inverter to be described in the instant application includes some of these improved features (such as a current sensitive latch triggered by a predetermined level of primary winding current and terminated by excessive inverter load conditions and/or in response to excessive operating temperature) which features, per se, form no part of the instant invention except insofar as they have been included herewith to complete the description of the presently preferred embodiment of the instant invention. Rather, the instant invention, constitutes a further improvement in the basic type of inverter circuit described above over circuits such as those shown in the above named co-pending patent application.

The invention to be described below involves a versatile and multifaceted power supply system for converting low frequency power line a.c. input to a current and/or voltage regulated d.c. output. The power supply includes two subsections, a high power subsection including transformer means and semiconductor switching means associated therewith to cause alternating current flow in a primary winding of the transformer means thereby inducing a varying magnetic field in the transformer core and creating an alternating current flow in a secondary winding of the transformer, and a full wave bridge rectifier, adapted to be electrically connected to a single phase low frequency a.c. power source to provide a source of full wave rectified a.c. power, that is to say unfiltered pulsating d.c. power for application to the aforesaid semiconductor switches, and a low power subsection including means for maintaining continuous inverter control. The use of unfiltered d.c. as a primary power source for the inverter herein described provides significant advantages over prior art inverter type power supplies heretofore known. Aside from obvious size and weight advantages to be gained by the elimination of low frequency filter components, the additional advantage of high power factor may be obtained. It has been a characteristic of switching inverters adapted to be used in conjunction with low frequency a.c. power line power factor has been seriously degraded by the filters required to produce d.c. power for the inverter. The invention to be described herein is adapted to be used as hereinabove described in conjunction with an unfiltered rectified a.c. power source through the use of a control system having a power consumption less than 5% of the total inverter power consumption whereby control system power factor becomes substantially insignificant when related to total system power factor. It is thereby possible to provide an inverter wherein the control system maintains continuous control over the semiconductor switching devices of the high power portion of the inverter even during those periods of the a.c. cycle when the voltage supplied to the power supply is zero. Thus, the logic signals for controlling the semiconductor switches as well as the drive signals for the switches themselves are independent of the high ripple which is to be found at the output of the full wave bridge rectifier. Additionally, starting and stopping functions for the inverter may be provided even when neither of the semiconductor swithcing devices is operative to cause current flow in the primary of the transformer and therefore when there is no output from the inverter. An inverter system in accordance with this invention provides significant advantages in a number of applications. The invention will be described below in a preferred exemplary embodiment as a battery charger. While the invention is not to be regarded as limited to battery chargers, many of the features and advantages of the invention may be conveniently pointed out by reference thereto. For example, in applications wherein operation is desired to be from a single phase low frequency a.c. power source, as for example, of the type found in the domestic home, considerations of current demand become extremely important. This invention provides a battery charger in the 1000 watt range which due to its high power factor, is directly operable from an existing 15 amp circuit. In fact, the capability for operation utilizing a long (i.e., 100 feet) extension while maintaining satifactory operation is a feature. Additionally, the current demand of a battery charger in accordance with this invention in combination with the power factor thereof is such that the capacity of a 15 amp circuit will be sufficient to power not only the battery charger to be described, but also such other loads as trouble-lights, drills, general lighting or other electrical apparatus. With a high power factor, the only consideration will be the direct addition of power ratings of the devices to be powered.

The preferred exemplary embodiment of this invention also includes a number of additional features especially desirable for battery charger operation. Complete isolation is provided between the input low frequency line power source and the d.c. output terminals. Maximum safety is thereby provided by eliminating possible shock hazard as might be found where a common connection between input and output are present. This isolation is maintained in the control system wherein no connection is required to the output terminals in order to provide voltage and/or current control. Due to the weight and size advantages derived as a result of high frequency operation, packaging innovations are possible which would be impractical in the case of a similar capacity battery charger of conventional design. For example, it is possible to package the complete battery charger in accordance with this invention in a plastic or similar nonconducting, noncorrosive case thus providing additional insulation and the capability of using the battery charger directly at the sites of the battery without the danger of creating a short circuit path from the battery terminal to ground.

Additional features of the invention include complete protection both for the battery and for the battery charger in the case of short circuit operation, incorrect polarity, insufficient open circuit battery voltage to permit recharge, and protection against high instantaneous voltage spikes due to intermittent connection between the charger and the battery terminals.

The features of the invention which are believed to be novel. . .are pointed out with particularity in the appended claims. The invention itself, however, both as to its organization and method of operation together with further objects and advantages thereof may best be understood by reference to the following description taken in connection with the accompanying drawings in which:

Figure 1:
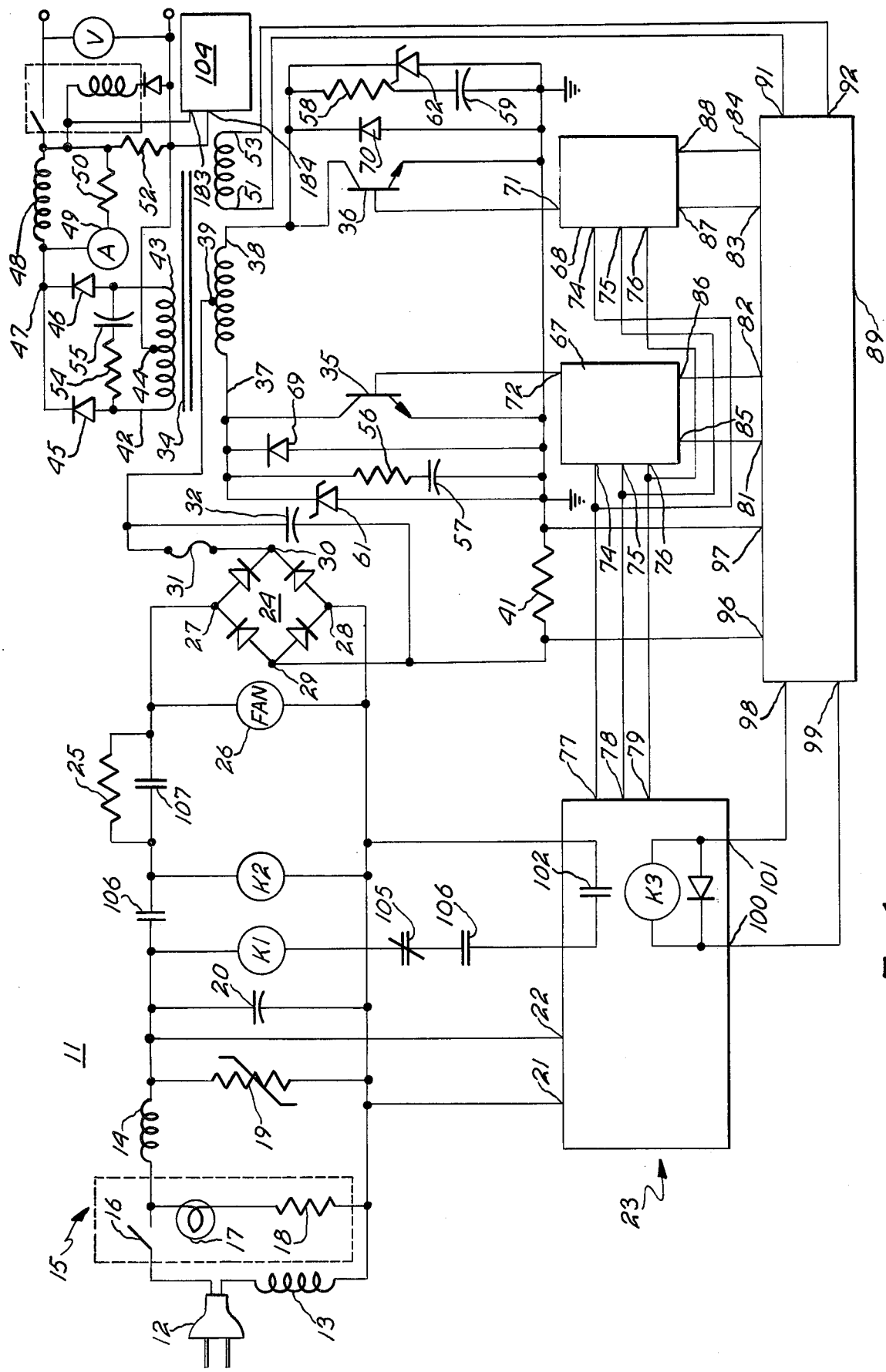
FIG. 1 is a partial schematic block diagram of an inverter power supply in accordance with a preferred exemplary embodiment of this invention.

The inverter generally designated 11 of FIG. 1 embodies many of the features of this invention. Input connector 12 is adapted to be plugged into a standard wall receptacle of the type commonly found in residential electrical distribution systems for supplying low frequency alternating current electrical power, as for example, 115 volts as is standard in most parts of the U.S. Inductors 13 and 14 are serially connected with said input connector 12 to provide for suppression of electromagnetic interference which would otherwise be coupled to the power distribution system and which in certain cases may be objectionable. Inductors 13 and 14 should therefore be chosen to present a low impedance at the frequency of the power source and a substantially higher impedance at the operating frequency and harmonics thereof of the inverter. On-Off switch/indicator 15 may be of any convenient type and includes a switch 16, a lamp 17 and a current limiting resistor 18 as desired. A low weight is a feature of this invention, it is preferable that assembly 15 be a single unit. Metal oxide varistor 19 provides protection for the inverter and especially for the diode rectifier to be described hereinbelow from high transient voltages appearing in the power source. Varistor 19 may be conveniently chosen from a line of such devices manufactured by General Electric Company under the GE-MOV trademark. Capacitor 20 is parallel connected with varistor 19 to further provide for suppression of electromagnetic interference. Inputs 21 and 22 of control and power supply module 23 are also connected in parallel circuit configuration with varistor 19 and capacitor 20 so that upon application of switch 16 input power will be supplied to the control and power supply module 23. Relays $k1$, $k2$ and $k3$ provide turn-on and turn-off features of the inverter along with various protective features hereinbelow described. Resistor 25 connected in parallel circuit configuration across the contacts of relay $k2$ provides a stepwise gradual turn-on function for the inverter. Fan 26 serves a dual function. It not only provides cooling for the components of the inverter proper, but also provides, recalling that it is a feature of a battery charger in accordance with this invention that it may be utilized in close proximity to the battery to be charged, for the dispersal of any battery gases which are generated during the charging process. The possibility for the formation of an explosive air-gas mixture is thereby alleviated. Full-wave diode bridge rectifier 24 is connected in standard circuit relationship with the input power source as controlled by the various control and protective devices hereinabove mentioned with inputs 27 and 28 connected to the a.c. power source and outputs 29 and 30 having a pulsating d.c. output appearing thereacross. In the embodiment shown, terminal 30 is positive with respect to terminal 29 and npn type transistors are used in inverter circuit. It is to be understood that this choice of polarities and choice of transistor types is not limited to the specific arrangement depicted. Fuse 31 is included for the purpose of providing protection against overload due to device failure. Capacitor 32 connected between terminal 30 and terminal 29 provides a low impedance path for high frequency inverter currents by-passing bridge rectifier 27. It is important to note that capacitor 32 is selected to have a low impedance at the operating frequency of the inverter, and a high impedance at the input power source frequency. Preferably, the value of capacitor 32 should be such that the 120 cycle ripple is at least 95% of peak voltage. The output of rectifier 27 which is a pulsating d.c. waveform will not therefore be smoothed by capacitor 32. High frequency transformer 34 in combination with transistors 35 and 36 comprise the high power portion of this inverter. For purposes of this invention the various windings of transformer 34 will be referenced by the reference numerals corresponding to the end points thereof. For example, the primary winding will be labeled 37–38. Primary winding 37–38 has a center tap 39 connected to positive bridge rectifier output 30. One end, 37, of primary winding 37–38 is connected to the collector of switching transistor 35. It is preferred that transformer 34 be wound in bifilar fashion on a high frequency ferrite core so as to maximize the coupling between windings, and minimizing losses. It is preferable in certain embodiments of this invention that transistors 35 and 36 be Darlington Power transistors. This allows for substantially higher current gains than are possible using single bipolar devices, and the base drive requirements are consequently substantially reduced. While the exemplary embodiment of FIG. 1 shows transistors as switching devices, it will be appreciated that other devices are suitable with corresponding circuit changes, for varied applications. For example, SCR's or gate turn-off thyristors may be used. The collector of transistor 36 is connected to the remaining end 38 of primary winding 37-38. The emitters of transistors 37 and 38 are connected together and the connection is returned to ground. Current sensing resistor 41 is connected in the aforementioned ground terminal and bridge rectifier negative output 29. Current sensing resistor 41 thus carries the full primary current of the inverter and provides a signal thereacross proportional to that current. The path of current through the high power portion of the inverter 11 of FIG. 1 may thus be seen to be from terminal 30 through fuse 31 through one half or the other of primary winding 37-38 for example, through portion 39-37, from the collector to the emitter of transistor 35, thence through resistor 41 and finally to negative bridge rectifier terminal 29. Alternate energization of the base terminals of transistors 35 and 36 provides alternate current flow through the primary 37-38 of transformer 34. Secondary winding 42-43 including center tap 44 is the output winding of the inverter. Diodes 45 and 46 comprise a full wave rectifier whereby d.c. output is produced between terminals 47 and center tap 44. Inductor 48 provides filtering at the operating frequency of the inverter, and once again as was the case of capacitor 32 not at the frequency of the power line source. Transformer winding 49-50 provides a control signal indicative of transformer voltage which will be utilized as described hereinbelow for control of the switching times of transistors 35 and 36. Ammeter 49 provides an indication of the output current of the inverter. While any convenient form of current monitoring may be used the circuit associated with ammeter 49 is especially suited to this invention. Inductor 48 exhibits a small but finite d.c. resistance, and consequently a voltage appears across inductor 48 which is proportional to the current flowing through it. This voltage is in addition to any high frequency voltage due to the filtering action of inductor 48. Ammeter 49 preferably chosen to be a voltmeter of convenient scale which when associated with resistor 50 will give an indication directly proportional to the current through inductor 48. Ammeter 49, since it will be chosen to be a d.c. voltmeter, will reject the high frequency signal appearing across inductor 48 due to the filtering action thereof. Resistor 52 is a load resistor for the inverter in accordance with this invention which provides a minimum level of current for the inverter when the output is disconnected from the desired load.

Resistor 54 and capacitor 55 are series connected across the output of secondary winding 42-43 to absorb energy transients due to the leakage reactants of the transformer winding. Similar networks composed of resistor 56 and capacitor 57 and resistor 58 and capacitor 59 are connected to primary winding 37-38. Zener diodes 61 and 62 are parallel connected with the aforementioned RC "snubbers" to reduce the losses therein. Zener diodes 61 and 62 are chosen to have a breakdown voltage in excess of the maximum collector to emitter voltage expected during normal operation of the inverter. For example, in the embodiment illustrated, the Zener diodes are chosen to have a breakdown voltage of 360 volts. It is to be understood that while a single Zener diode is illustrated schematically, that it may be necessary to provide a string of Zener diodes each having a smaller breakdown voltage to achieve the desired value. For example, four 90 volt Zener diodes serially connected may replace the single illustrated diode. It is to be emphasized that other voltage limiting devices, as for example, metal oxide varistors, or additional transistors may be utilized, and that the use of Zener diodes is exemplary. Diodes 69 and 70 are connected in parallel circuit configuration with the collector-emitter output elements of the transistors 35 and 36. The cathodes of diodes 69 and 70 are connected to the collectors of transistors 35 and 36, respectively, and the anodes to the emitters. These diodes provide a path for transformer magnetizing currents as one transistor turns off and before the other transistor turns on during periods of light load.

Base drive circuits indicated generally at 67 and 68 provide turn-on and turn-off signals at outputs 71 and 72, respectively, which are connected to the bases of transistors 35 and 36. Inputs 74, 75 and 76 of base drive units 67 and 68 are connected to outputs 77, 78 and 79, respectively, of control and power supply module 23. Output 77 provides a positive voltage for turning on the transistors, output 78 is common, and output 79 provides a negative voltage for rapid turn-off. Outputs 81 through 84 of logic subsystem 89 provide logic level turn-off signals to input 85 through 88 of base drive units 67 and 68. Inputs 91 and 92 of logic subsystem 89 are connected to transformer winding 51-53 which provides transformer voltage information to logic subsystem 89. Inputs 96 and 97 of logic subsystem 89 are connected to current sensing resistor 41 which as was described hereinabove provides a voltage signal proportional to the total inverter primary current. Inputs 98 and 99 of logic subsystem 89 are connected to 15 volt d.c. outputs 100 and 101 of control and power supply module 23. The operation of the various modules and subsystems of the power supply of FIG. 1 will be described in detail in conjunction with the detailed schematic diagrams thereof. In order that the operation of the various modules and subsystems be more clearly and easily understood, the overall operation of the power supply 11 of FIG. 1 will now be described. It is to be remembered that while many of the features of the power supply described herein are particularly adapted to battery charges as an exemplary embodiment of this invention, the invention is not limited to such battery chargers. Where other uses are contemplated, as for example, lamp ballasts wherein a.c. voltage may be the desired output, it is possible to eliminate the rectifier from the output of transformer 34 along with a current and voltage metering means to provide a high frequency a.c. output for operation of a lamp. Further changes would be required and logic subsystem 89 due to the nature of the load presented by a discharge lamp, but it can be seen that the basic approach used along with the advantages related thereto is still applicable. For example, high input power factor will be realized due to the lack of filtering at the input line power frequency. Protection against output irregularity such as short or open circuits is still provided and no extensive redesign would be necessary.

Start-up and protective features of the inverter of FIG. 1 may be most easily appreciated by assuming that initially no power is supplied to the inverter, that is to say that switch 16 is open. When switch 16 is closed, power is applied to the inputs 21 and 22 of control and logic power supply 23. The operation of control and logic power supply 23 will be fully described in conjunction with the detailed schematic diagram of FIG. 9.

Figure 2:
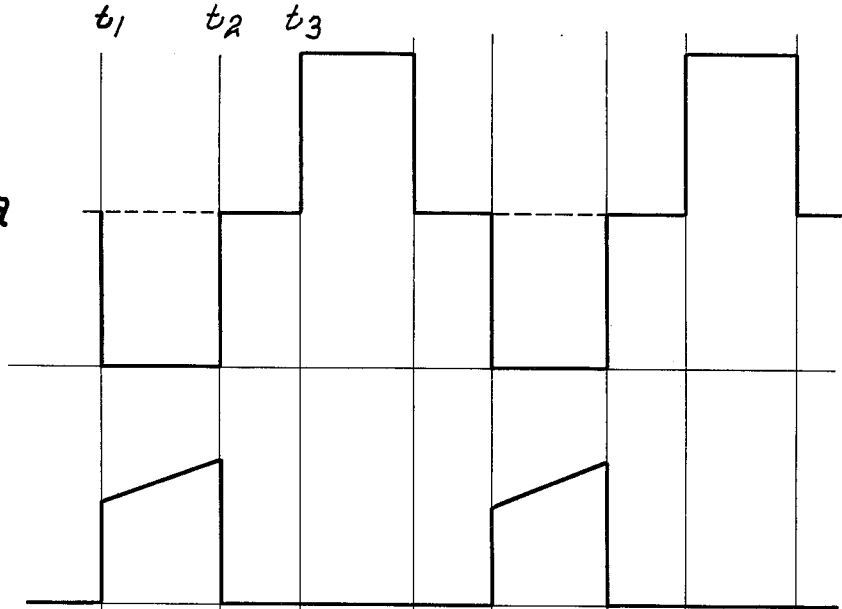
FIGS. 2a through 2e are waveform diagrams of particular voltages and currents associated with the inverter of FIG. 1.

For purposes of describing the start-up assume that the control functions of the logic and power supply unit 23 causes relay k3 to be energized therein closing contacts 102. Series connected relay contacts 103 associated with output protection circuit 104 which again will be more fully described in conjunction with the detailed schematic diagram of FIG. 10 will be closed if a suitable load is connected to the output of the battery charger. Normally closed thermostat contacts 105 complete the circuit through the coil of relay k1 which is serially connected with the aforementioned contacts 105, 103 and 102 across the input power line. Normally open contacts 106 of relay k1 permit power to flow to relay coil k2 and also through resistor 25 to fan 26 and full-wave rectifier 24. When sufficient time has passed for the coil of relay k2 to cause the contacts 107 to close, resistor 25 will be shorted and full power will be applied to the circuit. FIGS. 2a through 2e are various waveforms associated with the inverter of FIG. 1. FIG. 2a shows the collector-to-emitter voltage of one of the transistors 35 or 36 as a function of time. It is to be understood that the collector-to-emitter voltage of the transistor not shown in opposite in phase at all times and equal in magnitude to the voltage illustrated. The voltage varies from approximately zero volts, in actuality the saturation voltage of the transistor, to approximately twice the peak voltage appearing between terminals 29 and 30. The voltage is zero when the transistor is conducting and rises to the supply voltage when the transistor turns off and increases again to approximately twice the supply voltage due to autotransformer action of the primary when the alternate transistor is conducting. In FIG. 2 the dotted line indicates the supply voltage level. FIGS. 2b and c are waveform diagrams of the current flowing in the collector-to-emitter circuits of the transistors. Note that the operation of the inverter is "quasi square-wave", that is to say that during each cycle there is a period of time when neither transistor is conducting. The relative lengths of time during which first one transistor conducts, the neither transistor conducts, and then the alternate transistor conducts are regulated by the logic subsystem 89. By varying the ratio of conducting to nonconducting time, output voltage and/or current may be regulated. FIG. 2d is a representation of the output voltage of the inverter as a function of time. FIG. 2e is a representation of the output current of the inverter showing the effect of high frequency inductor 48 which maintains a certain level of current during the time when neither of the transistors is conducting. It is to be emphasized that the waveform diagrams of FIG. 2 are accurate only for periods of time small compared to the ripple frequency of the output of bridge rectifier 24.

Figure 4:
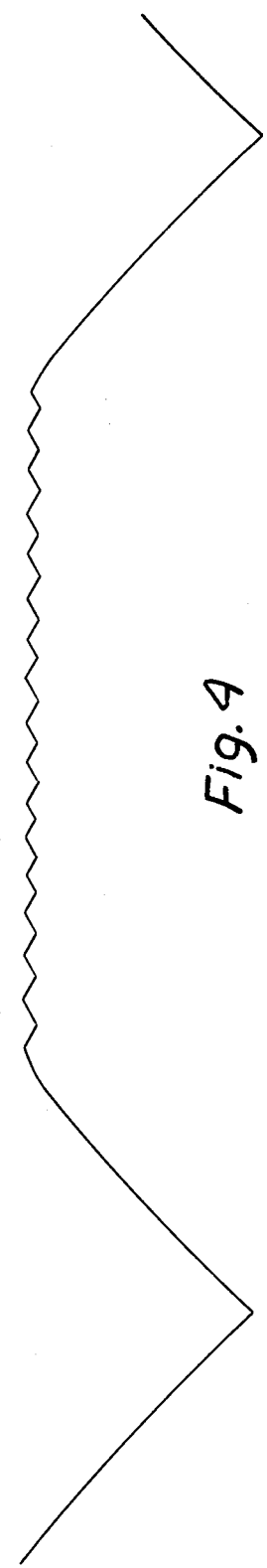
FIG. 4 is a waveform diagram of the output voltage of the inverter of FIG. 1.

FIG. 4 shows a more accurate representation of the actual voltage appearing across one of the transistors 35 or 36. For purposes of ease of illustration, the operating frequency of the inverter has been shown as approximately 1800 Hertz, while in the embodiment illustrated in FIg. 1, the operating frequency is preferably chosen to be in excess of 20,000 Hertz. The primary waveform is a modulated 120 Hertz signal corresponding to the ripple frequency of the output of rectifier 24. During approximately the first and last quarter of the cycle, the inverter operates under full square wave mode, that is to say there is no period during which both transistors are "off". The collector-to-emitter voltage therefore rises from zero to a voltage b which is twice the rectified a.c. voltage a. As the rectified a.c. voltage increases further, quasi square wave operation is initiated as indicated beginning with the cycle generally designated c. It will be noted that the waveform except for the effects of the 120 Hertz modulation is identical to that of FIG. 2a. FIG. 4 shows the output voltage which will be noted is a constant save only for the periods during which the output voltage of full wave rectifier 24 is insufficient to supply the required current, and save also low voltage ripple at twice the operating frequency of the inverter. Once again it is pointed out that these frequencies are not to scale.

Figure 5:
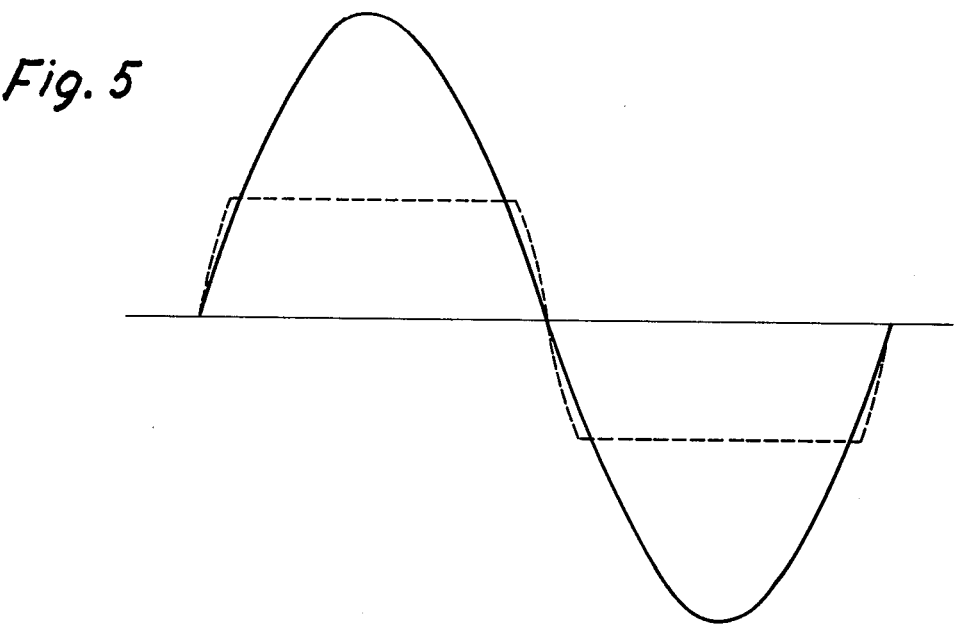
FIG. 5 is a waveform diagram of the input voltage and input current of the inverter of FIG. 1.

FIg. 5 shows the input voltage and current of the embodiment of this invention of FIG. 1. Note that there is no phase shift between the voltage and current and therefore that the power factor will be high.

Figure 6:
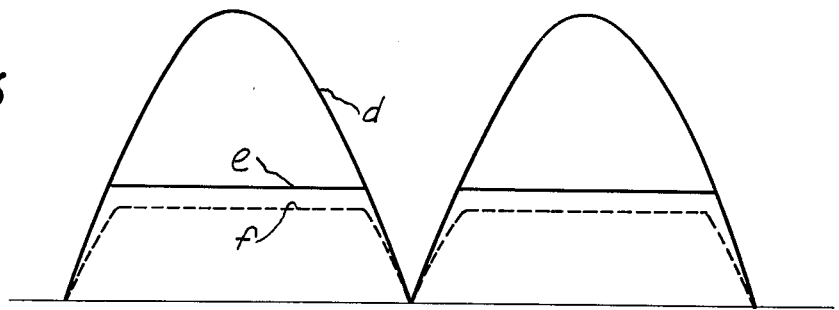
FIG. 6 is a waveform diagram of the output voltage and current of the inverter of FIG. 1.
Figure 6A:
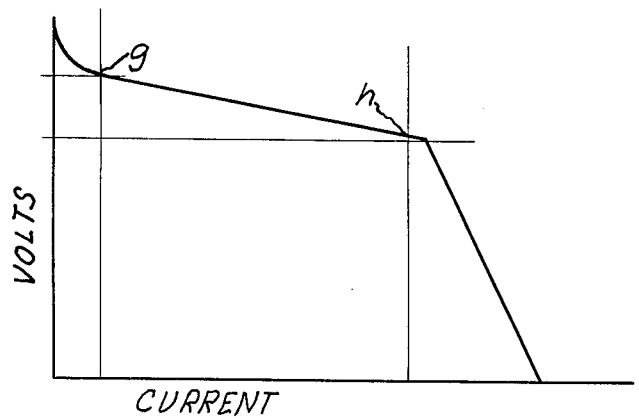
FIG. 6a is a graphical representation of the output current versus the output voltage for the exemplary embodiment of this invention of FIG. 1.

FIG. 6 shows the voltage waveform at the output terminals of a battery charger in accordance with this invention for varying load conditions. The full wave rectified since wave b is the voltage which would appear absent the regulation provided by logic subsystem 89, Waveform e shows the output regulated voltage resistive load. With a battery load, the output waveform is similar to the voltage shown and the voltage is smoothed by the presence of the battery which fills in the voltage of the resistive load voltage. Waveform f is the output current which would flow through a resistive load. It should be noted that the input and output currents are symmetrical save only for the rectification of the output current. This is due to the fact that there is substantially no filtering and consequently no energy storage in the inverter at 120 Hertz. Input power factors as high as 0.96 are feasible. FIG. 6a shows the relationship between output voltage and output current for the battery charger of FIG. 1. It should be noted that between the lower and upper limits of the design current, that is to say between points g and h on the curve of FIG. 6a, the output voltage is maintained substantially constant. The slight reduction in voltage with increasing current is due to the fact that the logic subsystem, in order to maintain isolation between the line power source and the output, senses transformer volts as will be described hereinbelow and not output volts, and therefore that losses including those due to leakage reactance in the secondary winding 42-43 and in the associated rectifiers and filters are not compensated for. As the current demand increases beyond that indicated at point h, the voltage rapidly decreases, but the current continues to increase albeit at a reduced rate until the final limit is reached. This increase in current beyond the point of regulation provides a short circuit current capacity which is useful in the battery charger operation described for providing additional current.

Figure 7:
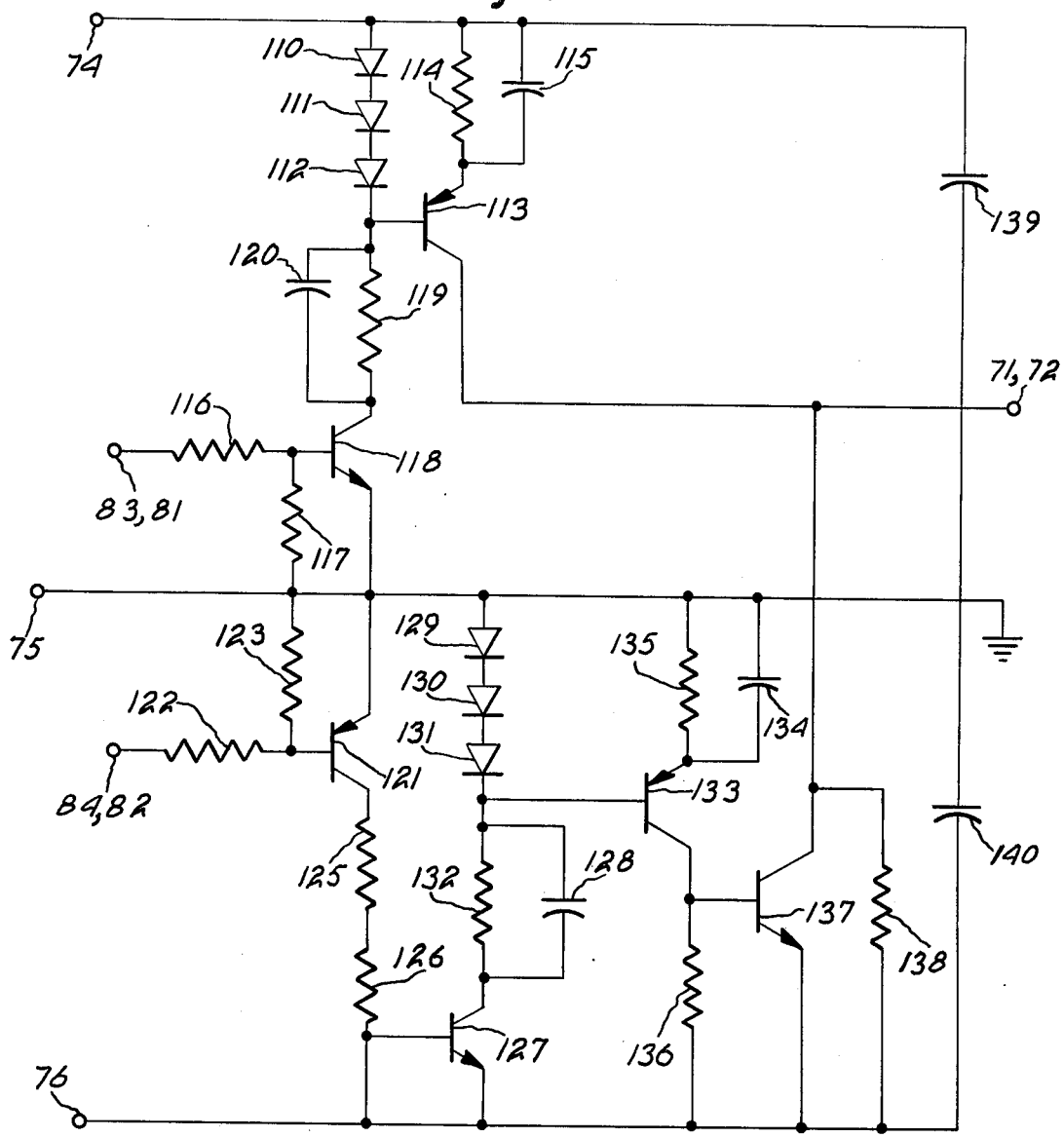
FIG. 7 is a schematic diagram of a base drive circuit in accordance with this invention.

FIG. 7 is a detailed schematic diagram of one of the two base drive units 67 and 68 in accordance with this invention. Input terminal 74 is adapted to be connected to output terminal 77 of control and power supply module 23 and has a positive potential. Terminals 75 is ground and terminal 76 receives a negative potential. Diodes 110 through 112, transistor 113, resistor 114 and capacitor 115 comprise a current source. Capacitor 115 is supplied to improve the switching time of the current source. Resistors 116 and 117, transistor 118, resistor 119 and capacitor 120 comprise a switch whereby when a positive going on signal is supplied to terminal 81, 83, transistor 118 is turned on, the turn-on speeded up by capacitor 120. Current then flows through diodes 110–112, resistor 119, and transistor 118. Transistor 113 then turns on and a constant current is supplied to the selected transistor at terminals 71 or 72. The remainder of the base drive circuit of FIG. 7 comprises the turn-off portion. When a negative going turn-off signal is applied to either terminal 82 or 84, transistor 121 is turned on through biasing resistors 122 and 123. Current then flows through resistors 125 and 126 turning on transistor 127. Capacitor 128 speeds up the turn-on of transistor 127. When transistor 127 turns on, current flows through diodes 129-131 and resistor 132, turning on transistor 133 which acts as a current source. Capacitor 134 speeds up the turn-on of transistor 133. Current flowing through resistor 135, transistor 133 and resistor 136 turns on current amplifying transistor 137. Reverse base current is thereby caused to flow in a switching transistor which is being turned off hastening the turn-off process. Resistor 138 provides a path for the base current of the switching transistors when neither the on or off active functions are being performed. that is to say during that time when neither transistor 113 or 137 is on. Capacitors 139 and 140 are connected between the + and − voltage terminals and ground and supply additional filtering therefore.

Figure 8:
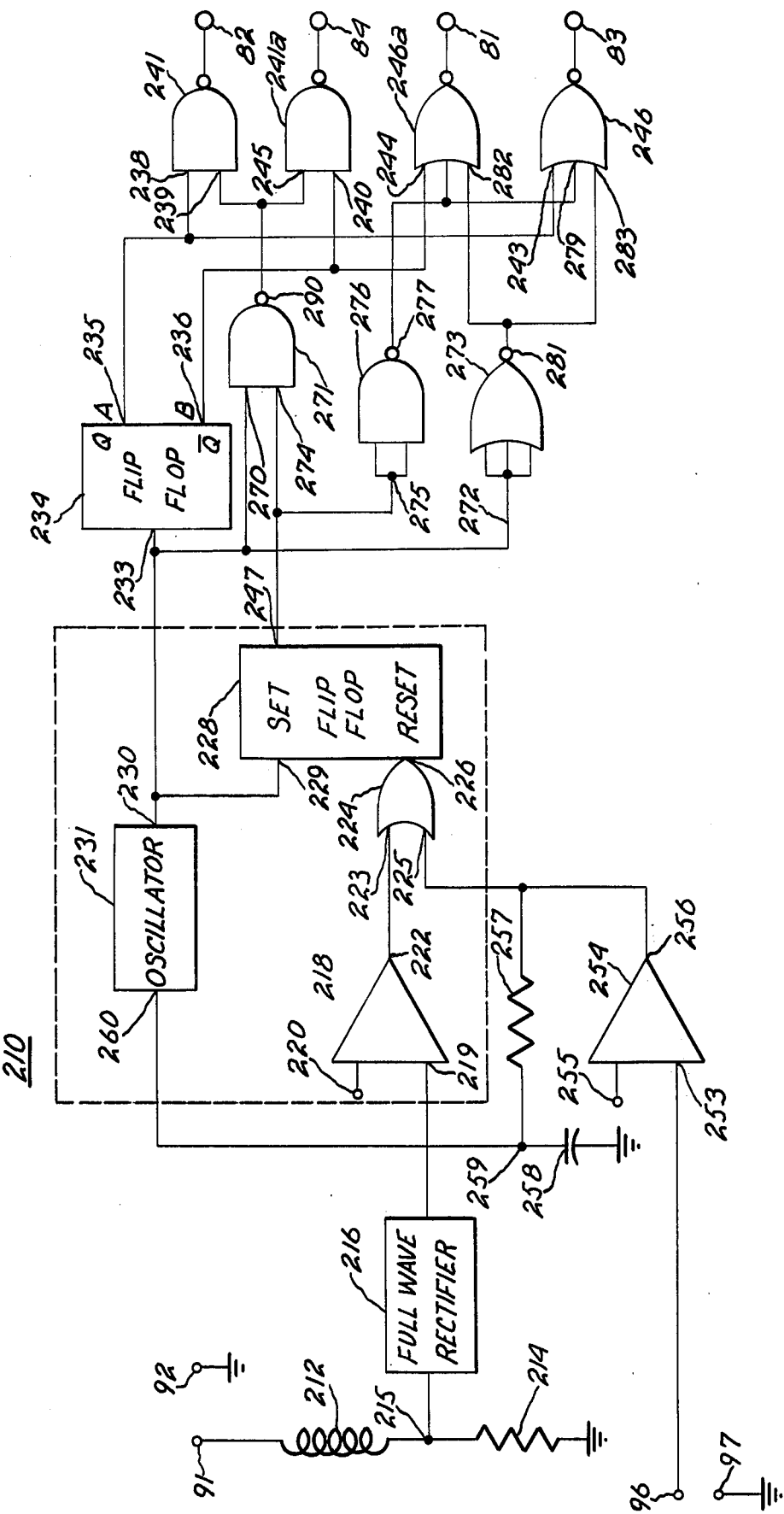
FIG. 8 is a block diagram schematic of a logic subsystem in accordance with this invention.

FIG. 8 is a block diagram schematic of logic subsystem 89 in accordance with one embodiment of this invention. Logic subsystem 89 is completely described in a co-pending U.S. patent application of Loren H. Walker, entitled "Inverter Control Circuit" and filed of even date herewith. The inverter described in the application includes some of the improved features of the INVERTER CONTROL CIRCUIT hereinabove referenced, which features, per se, form no part of the instant invention except insofar as they have been included herewith to complete the description of the presently preferred embodiment of the instant invention.

Input terminals 91 and 92 receive a signal indicative of instantaneous transformer voltage which is derived from winding 51-53. Where it is desired that precise control over output voltage of the inverter be maintained with varying loads, winding 51-53 is preferably wound tightly coupled with secondary winding 42-43 of transformer 34. Where it is desired that a preselected reduction in output voltage with increasing current be provided, winding 51-53 is preferably tightly coupled to primary winding 37-38, or to the core of transformer 34 and not tightly coupled to secondary winding 42-43. Inductor 212 and resistor 214 integrate this voltage to provide a signal proportional to instantaneous transformer flux. This signal appears at node 215 and is rectified by full wave rectifier 216 to provide an input for comparator 218 at input terminal 219. Full wave rectifier 216 insures that the polarity of the signal proportional to instantaneous transformer flux will always be positive. Input terminal 220 of comparator 218 is adapted to receive the reference signal which is selected to be representative of the desired operating peak flux of the transformer 34. In operation, therefore, comparator 218 will provide an output at output terminal 222 which remains low so long as the sensed flux at node 215 as rectified by full wave rectifier 216 and appearing at input terminal 219 is less than the reference level set at input terminal 220 of comparator 218. When the sensed flux increases above the reference flux, the output of comparator 218 will switch to a high logic level triggering OR gate 224 through input 223. This will apply a reset signal to input 226 of flip-flop 228. The set input 229 of flip-flop 228 is connected to output 230 of oscillator 231. In operation, therefore, the output 230 of oscillator 231 sets flip-flop 228 which is then reset when the transformer flux reaches the preset level established at input level 220 of comparator 218. Oscillator output 230 is also connected to flip-flop 234, input 233. This flip-flop is preferably a JK type flip-flop having a commonly connected input. Outputs 235 and 236 are connected to inputs 238 and 243 of NAND gate 241 and NOR gate 246. Q output 236 is connected to input 240 of NAND gate 241a and to input 244 of NOR gate 246a. Oscillator output 230 is connected to input 270 of NAND gate 271, and also to input 272 of inverter 273. While inverter 273 is shown as a NOR gate, having all three inputs thereof connected in common, it is emphasized that any logic circuit providing an inverting function may be utilized, and that the availability of integrated circuit chips containing a plurality of discrete logic elements may dictate the particular element utilized in many instances. Output 247 of flip-flop 228 is connected to input 274 of NAND gate 271, and also to input 275 inverter 276. It is to be noted that in this case a NAND logic element is used with both inputs thereof connected in common to provide the required inverter function, for the reasons hereinabove stated. Output 277 of inverter 276 is connected to input 278 of NOR gate 246a and also to input 279 of NOR gate 246. Output 281 of inverter 273 is connected to input 282 of NOR gate 246a and also to input 283 of NOR gate 246. Outputs 81 through 84 of logic gates 241, 241a, 246a and 246 are connected to inputs 85 through 88, respectively, of base drive circuits 67 and 68. In operation, outputs 81 and 83 provide positive going on signals to base drive circuits 67 and 68, respectively. In order for an on signal to be supplied, it is necessary that taking, for example, the case of output 81, flip-flop 234 have its Q output 235 be high, and therefore its Q output 236 which is connected to input 244 of NOR gate 246a be low. Additionally, output 277 of inverter 276 must be low therefore requiring that input 275 of inverter 276 be high, which condition is met when flip-flop 228 output 247 is high. Additionally, input 282 of NOR gate 246a must be low which condition is met when input 272 of inverter 273 is high, which condition is met when output 230 of oscillator 231 is high. Similar conditions are required to provide a positive going signal at output 83 of NOR gate 246 save only that output 235 of flip-flop 234 must be low whereby output 236 is high. Off or negative going signals are provided at outputs 82 and 84 in the following manner. Taking for example, output 82 of NAND gate 241, a negative output is provided whenever either of outputs 235 of flip-flop 234 or output 290 of NAND gate 271 is low. Output 290 of NAND gate 271 is low whenever either input 270 or 274 is low. Input 270 is low whenever oscillator output 230 is low, and input 274 is low whenever flip-flop 228 output 247 is low. A negative going off signal is present at output 84 of NAND gate 241 whenever the aforementioned conditions with respect to NAND gate 241 are met saving that outputs 235 and 236 assume the opposite logic conditions to those aforementioned. Inputs 96 and 97 are connected to current sensing resistor 41 hereinabove described. The voltage appearing across current sensing resistor 41 is applied to input 253 of comparator 254. Input 255 of comparator 254 is adapted to receive a preselected reference signal proportional to the maximum desired current flowing in resistor 41. The output 256 of comparator 254 therefore will remain low as long as the current flowing in resistor 41 is less than the current represented by the preselected reference signal appearing at input terminal 255 of comparator 254. If and when the current flowing in resistor 41 exceeds the preselected reference current, output 256 of comparator 254 will switch to the high state, triggering reset input 226 of flip-flop 228 through input 225 of OR gate 224. The conduction of whichever of transistors 35 or 36 was at the time conducting will be terminated. Additionally, resistor 257 and capacitor 258 form an integrating network, and a voltage will appear at node 259 representative of the time integral of the output of comparator 254. Frequency bias input 260 of oscillator 231 is provided to decrease the fundamental frequency of oscillator 231 in response to an increasing voltage appearing at node 259. The duty cycle during which transistors 35 and 36 conduct is thereby reduced to reduce output voltage during overload conditions without the necessity for providing extremely short periods of conduction and thereby allowing the use of transistors having a normal range of turn-off times.

Figure 3:
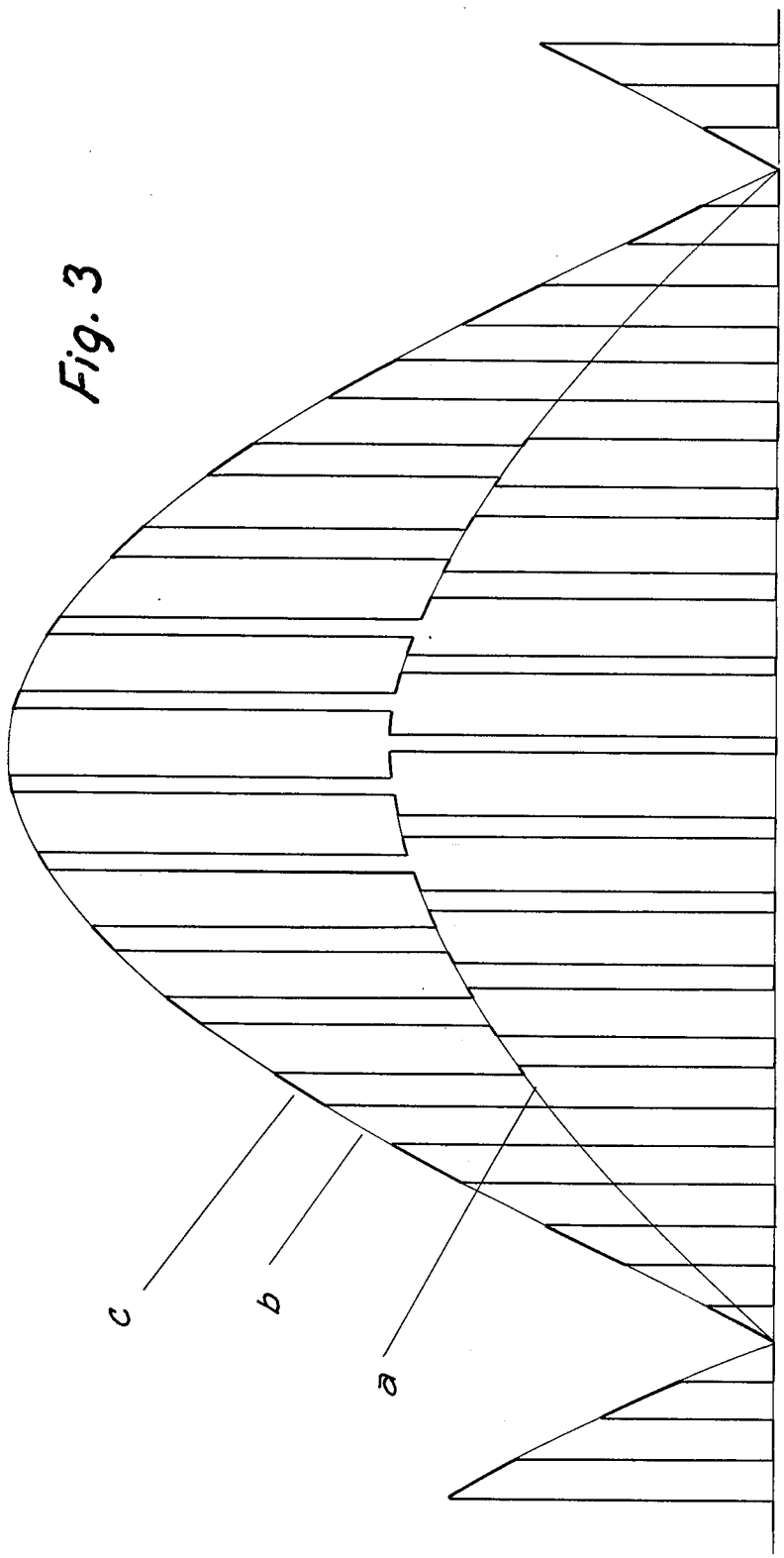
FIG. 3 is a further waveform diagram of certain voltages associated with the inverter of FIG. 1.
Figure 9:
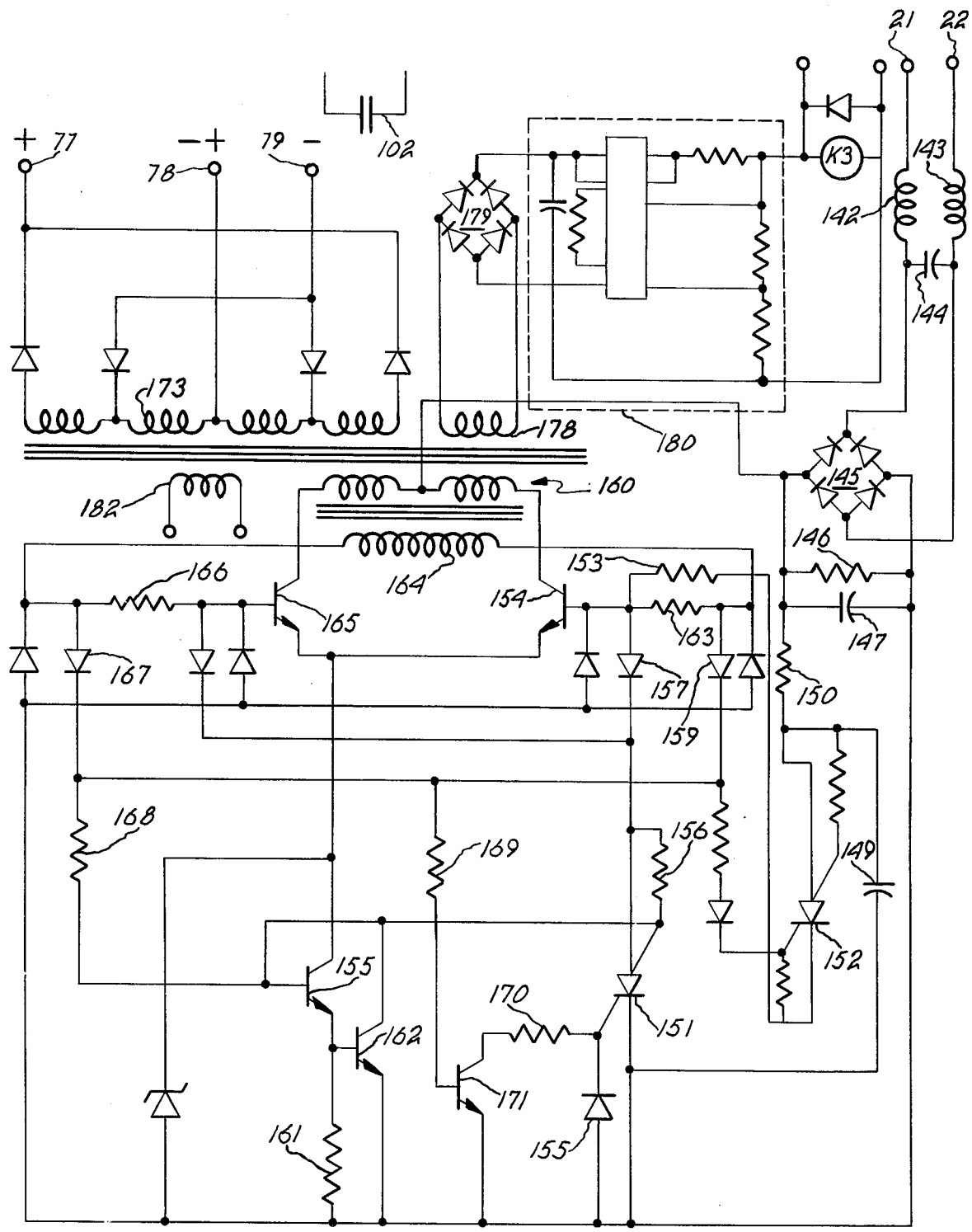
FIG. 9 is a schematic diagram of a control and power supply module in accordance with this invention.

Control and power supply module 23 is illustrated schematically in the detailed diagram of FIG. 9. Input terminals 21 and 22 are adapted to receive line voltage power when switch 16 is closed. Inductors 142 and 143 and associated capacitor 144 further suppress electromagnetic interference which is generated within the control and power supply module itself. Bridge rectifier 145 along with associated bleeder resistor 146 and filter capacitor 147 provide essentially ripple free d.c. voltage for the operation of this supply. This is to be distinguished from high power bridge rectifier 24 with its associated capacitor 32 which in combination do not provide pure d.c. but, on the contrary, provide a d.c. voltage with essentially 100% ripple for high power factor. As it is the function of the power supply 23 of FIG. 9 to provide continuous control over the operation of the inverter, it is not possible to operate with a d.c. voltage with 100% ripple. Therefore, capacitor 147 is chosen to provide substantially ripple-free d.c. voltage for the operation of control and logic power supply 23. The presence of filter capacitor 147 prevents control and logic power supply 23 from itself having a near unity power factor. It is, therefore, necessary that the power consumption of control and logic power supply 23 be substantially less than the total power consumption of the inverter in accordance with this invention, thereby, insuring that the overall power factor is not seriously degraded. It is preferable, therefore, that the full power consumption of control and logic power supply 23 be less than 5% of the total power consumption of the inverter. The operation of the primary portion of control and logic power supply 23 is completely described in a co-pending commonly assigned application of John P. Walden, entitled "D.C. to A.C. Inverter Having Improved Switching Efficiency, Overload and Thermal Protection Features" and filed of even date herewith. FIG. 3 thereof shows the complete primary circuit of the control and logic power supply of FIG. 9 omitting only the electromagnetic interference suppression means, bridge rectifier bleeder resistor and filter hereinabove described. The description of the operation of control and logic power supply 23 will therefore be brief.

Capacitor 149 is charged through resistor 150 and the cathode gate-cathode circuits of SCR 151. When a sufficient voltage is reached across capacitor 149, SCR 152 fires thus applying a starting pulse through resistor 153 to supply base current to transistor 154 and to turn "on" transistor 155 via resistor 156 and diode 157, and also through resistor 163, diode 159 and resistor 168. The discharge path for capacitor 149 through SCR 152 in supplying this starting pulse is completed through diode 158 which also supplies a reverse bias to SCR 151 thus preventing SCR 151 from being triggered during this initial start-up cycle. As transistor 154 turns "on", the primary current in transformer 160 increases through transistors 154 and 155 through resistor 161. Transistor 162 performs a regulating function. As transformer 160 begins to saturate, the current increases rapidly through resistor 161 thus turning transistor 162 "on" and transistor 155 "off" and triggering SCR 151 (the reverse bias now having been removed from the cathode gate after capacitor 149 is discharged) to its conductive state which, through diode 157, quickly drains away the stored charge from the base of transistor 154 and, through resistor 163, the remaining current flowing in this direction from tertiary winding 164. Accordingly, both the base and emitter of transistor 154 are actively controlled so as to switch transistor 154 to its "off" state. Thereafter, the stored energy in transformer 160 operates to initiate the conduction of switching transistor 165 by inducing current of the proper polarity in tertiary winding 164, which, in turn, is supplied to the base of transistor 165 through resistor 166 and to the base of transistor 155 through resistor 166, diode 167 and resistor 168 to complete the conditioning of transistor 165 for transitioning to its "on" state. It should now be appreciated, resistor 169, 170 and transistor 171 are provided to help insure that SCR 151 remains in its "off" or non-conductive state except during switching transitions of transistors 154 and 165. Secondary winding 173 provides the required positive and negative voltages for the base drive circuit which appear at terminals 77-79 following rectification by diodes 174-177. Secondary winding 178 and associated bridge rectifier 179 produce an unregulated d.c. output, which is regulated by the circuit generally designated 180 which may be any regulator circuit of the type commonly known to those skilled in the art, as for example, the LM 723 manufactured by National Semiconductor Corporation. Relay k3 and associated contacts 102 perform the functions hereinabove mentioned. The logic subsystem 89 hereinbelow described is provided with an internal oscillator or clock to provide timing signals for the operation of this inverter. It may be desirable for purposes of reducing cost and complexity to provide a clock signal from the control and power supply module 23 of FIG. 9. To this end, secondary winding 182 is provided, the output of which is a substantially square waveform at the frequency of operation of control and power supply unit 23.

Figure 10:
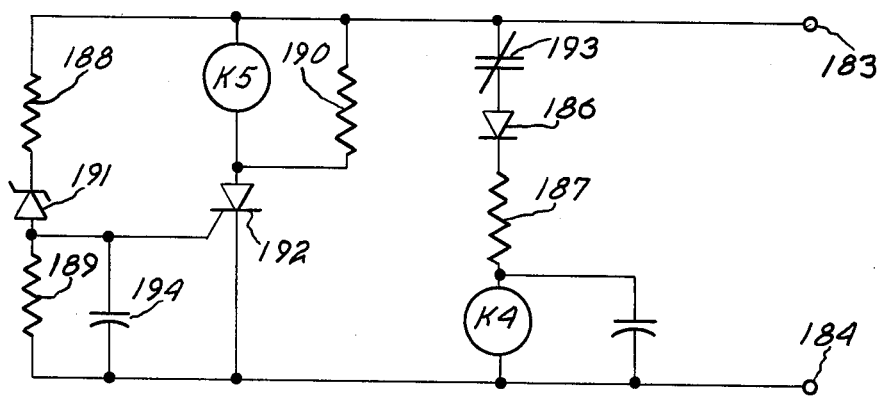
FIG. 10 is a schematic diagram of an output protective circuit in accordance with this invention.

FIG. 10 is a schematic diagram of the output protective circuitry 104 in accordance with this invention. Terminals 183 and 184 connect to the positive and negative output terminals of the battery charger, respectively. Two functions, under voltage control and over voltage control are provided by output protective circuit 104. Diode 186, resistor 187 and relay k4 along with associated contacts 103 provide under voltage protection. Resistors 188, 189 and 190, Zener diode 191, SCR 192 and relay coil k5 along with associated normally closed contacts 193 provide over voltage protection. For purposes of explanation of the operation of output protective circuit 104, assume that the battery charger is connected to a partially discharged 12 volt battery having an open circuit voltage of 6 volts. Relay contacts 193 will be closed, and assuming that the polarity is correct, that is to say that the + and − battery charger terminals are connected to the + and − battery terminals, respectively, diode 186 will conduct and current, limited by resistor 187, will flow through relay coil *k*4. Resistor 187 is selected to provide sufficient current flow through *k*4 at the minimum desired open circuit battery voltage. This voltage should be chosen low enough to enable substantially dead batteries to be charged, but high enough to prevent the application of charge to a completely dead battery, which will not accept charge. A voltage of between 3 and 5 volts is preferred. Assume now that the output terminals are shorted. No current will flow to diode 186, resistor 187 and relay coil *k*4, and consequently relay contacts 103 will not close thereby preventing the application of power to bridge rectifier 24. The battery charger therefore will not be energized. Assume now that an over voltage is present at terminals 183 and 184. This voltage may occur due to sparking at the battery terminals or for other reasons. Resistors 188 and 189 in combination with Zener diode 191 comprise a voltage divider such that the gate electrode of SCR 192 will be energized only when the output volrage of the inverter exceeds 20 volts. Capacitor 194 provides for suppression of normal operating noise voltages at the gate electrode of SCR 192. When the voltage exceeds 20 volts, the gate electrode will be energized and SCR 192 will turn "on" energizing relay coil *k*5. Resistor 190 limits the current flowing through relay coil *k*5. When relay coil *k*5 energizes, normally closed contacts 193 will open under voltage relay *k*4, will sense an under voltage and the inverter will be deactivated by the opening of contacts 103 associated with relay *k*4. Power will thereby be removed from bridge rectifier 24 and inverter operation will cease.

It is to be emphasized that the output protective circuits 104 are particularly designed to be applied to an embodiment of this invention adapted to battery charger. It has no application where the output voltage of the inverter is an a.c. voltage, as for example, of the type used to power a lamp.

Figure 11:
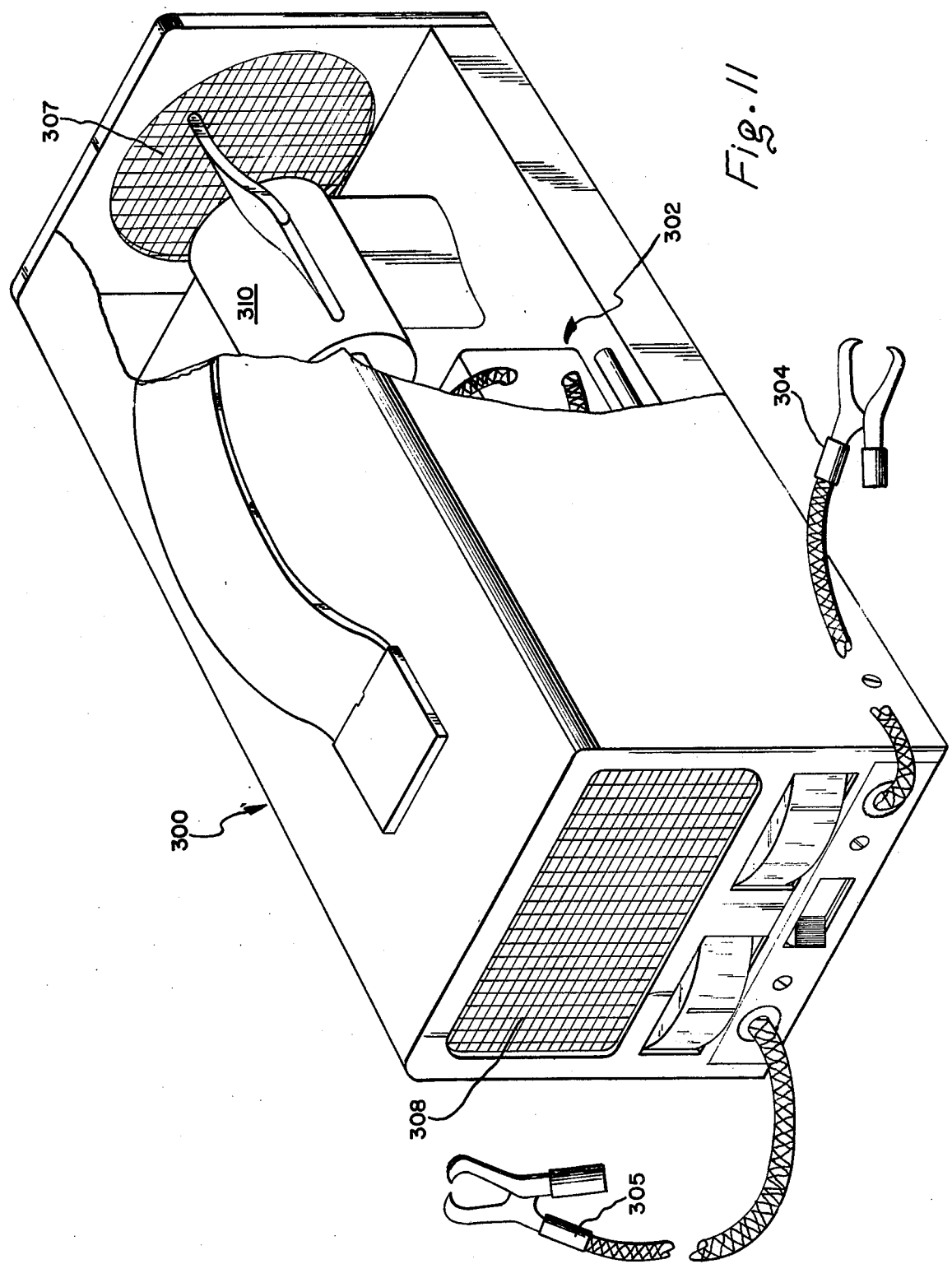
FIG. 11 is a pictorial representation of a battery charge in accordance with this invention.

FIG. 11 illustrates a battery charger in accordance with one aspect of this invention along with a suitable housing therefore. A case indicated generally at 300 is provided which preferably is constructed of nonconductive material so as to subtantially isolate the inverter power supply components indicated generally at 302 inside the enclosure from the outside environment save only for the necessary input and output cable connections, as for example, as illustrated at 304 and 305. Case 300 is provided at opposite ends thereof with orifices 307 and 308 which may be provided if desired with protective screening thereover, to permit the passage of air therethrough. Fan 310 is mounted inside case 300 to provide for the dispersion of potentially explosive battery vapors which may be generated during the conversion process. It is to be understood that fan 310 may be of any convenient type as is well known to those skilled in the art. Fan 310 corresponds generally to fan 26 of FIG. 1.

The battery charger hereinabove described is but one exemplary embodiment of this invention. While the invention has been shown and described in accordance with an embodiment wherein an a.c. electrical input is converted to a d.c. electrical output, as has been mentioned hereinabove, the invention is intended to include also those embodiments wherein an a.c. electrical input is converted to an a.c. electrical output and wherein a d.c. electrical output is converted to an a.c. or d.c. electrical output, in this case by elimination of the full-wave rectifier hereinabove described. The advantages of high efficiency, high power factor, versatility, safety, and positive control over inverter operation at all times are and will be common to all embodiments of this invention in accordance with the teachings hereof.

While the invention has been particularly shown and described with reference to several preferred embodiments thereof, it will be understood by those skilled in the art that various changes in form and detail may be made therein without departing from the true spirit and scope of the invention is defined by the appended claims.

We claim:

1. A high frequency inverter power supply for operation from a single phase low frequency a.c. power source comprising:
    a full wave rectifier section including input terminals adapted to be connected to said a.c. power source and first and second oppositely poled output terminals providing full wave rectified substantially unfiltered pulsating d.c. power at said output terminals;
    a high frequency inverter section having an operating frequency substantially higher than said a.c. frequency, said high frequency inverter section connected to said first and second oppositely poled output terminals, said high frequency inverter section including high frequency transformer means having a primary winding and a secondary winding, and controllable solid state switching means electrically connected to said oppositely poled output terminals and to said primary winding;
    reactive means having a high impedance at said low a.c. frequency and a low impedance at said inverter operating frequency, said reactive means connected to said oppositely poled output terminals providing a low impedance, high frequency path thereacross, said reactive means providing substantially no filtering or power storage at said low a.c. frequency;
    control means operatively associated with said controllable solid state switching means for providing alternate conduction in said primary winding at said operating frequency whereby a waveform is produced in said secondary winding characterized by a first frequency equal to said high operating frequency amplitude modulated by a second frequency equal to said low a.c. frequency.

2. The high frequency inverter power supply of claim 1 wherein said control means further comprises sensor means responsive to selected transformer parameters and generating an output signal proportional thereto, and means responsive to the output of said sensor means operative to vary the duty cycle of said high frequency inverter section.

3. The high frequency inverter of claim 2 wherein said selected transformer parameters comprise the total current flowing in said primary.

4. The high frequency inverter of claim 2 wherein said selected transformer parameters comprise the instantaneous flux in said transformer.

5. The high frequency inverter of claim 3 wherein said selected transformer parameters further comprise the instantaneous flux in said transformer.

6. The high frequency inverter of claim 2 wherein said control means further includes low power DC supply means providing a source of substantially pure DC for maintaining continuous instantaneous control over said controllable solid state switching means.

7. The high frequency inverter of claim 6 wherein said control means further includes switch means controlling the application of AC power to said full wave rectifier means, providing AC power to said full wave rectifier means only when said control means has become fully operative.

8. The high frequency inverter of claim 1 further comprising rectifier means operatively associated with said secondary winding to produce an output DC waveform therefrom.

9. The high frequency inverter of claim 8 further including filter means connected to said secondary winding operative to smooth the high frequency waveform so that a waveform is produced characterized by a varying DC level which substantially corresponds to the output of said full wave rectifier means.

10. The high frequency inverter of claim 5 further comprising rectifier means operatively associated with said secondary winding to produce an output d.c. waveform therefrom.

11. The high frequency inverter of claim 10 further including filter means connected to said secondary winding operative to smooth the high frequency waveform and provide an output characterized by a varying d.c. level which substantially corresponds to the output of said full wave rectifier means.

12. The high frequency inverter of claim 1 wherein said solid state switching means comprise transistors having base, collector and emitter electrodes, said collector electrodes and said emitter electrodes operatively connected with said primary winding and with said output terminals of said full wave rectifier means to provide alternating current in said primary winding in response to control signals applied to said base electrodes.

13. The high frequency inverter of claim 12 wherein said primary winding comprises a center tapped winding having first and second ends, said center tap connected to one of said oppositely poled output terminals, said first end connected to the collector of one of said transistors, said second end connected to the collector of said other transistor, and said emitters connected to the other of said oppositely poled output terminals.

14. The high frequency inverter of claim 7 wherein said solid state switching means comprise transistors having base, collector and emitter electrodes, said collector electrodes and said emitter electrodes operatively connected with said primary winding and with said output terminals of said full wave rectifier means to provide alternating current in said primary winding in response to control signals applied to said base electrodes.

15. The high frequency inverter of claim 14 wherein said primary winding comprises a center tapped winding having first and second ends, said center tap connected to one of said oppositely poled output terminals, said first end connected to the collector of one of said transistors, said second end connected to the collector of said other transistor, and said emitters connected to the other of said oppositely poled output terminals.

16. The high frequency inverter of claim 7 wherein said low power d.c. supply means comprises
rectifier means adapted to be connected to said source of a.c. power,
filter means for providing substantially pure d.c. power at the output thereof,
low power, high frequency inverter means including transformer means and switching means operatively associated therewith, and a plurality of secondary windings on said transformer means, providing selected high frequency a.c. output voltages,
second rectifier means operatively associated with at least one of said plurality of secondary windings for providing selected d.c. output voltages for operation of said control means.

17. The high frequency inverter of claim 4 wherein said solid state switching means comprise transistors having base, collector and emitter electrodes, said collector electrodes and said emitter electrodes operatively connected with said primary winding and with said output terminals of said full wave rectifier means to provide alternating current in said primary winding in response to control signals applied to said base electrodes.

18. The high frequency inverter of claim 4 wherein said primary winding comprises a center tapped winding having first and second ends, said center tap connected to one of said oppositely poled output terminals, said first end connected to the collector of one of said transistors, said second end connected to the collector of said other transistor, and said emitters connected to the other of said oppositely poled output terminals.

19. A high frequency inverter battery charger for operation from a low frequency single phase a.c. power source comprising
first rectifier means, adapted to be connected to said a.c. power source, having an output providing full wave rectified pulsating d.c. power at first and second oppositely poled terminals thereof,
a capacitor electrically connected between said first and second oppositely poled terminals characterized by an impedance which is high at said low frequency single phase a.c. power source frequency, and low at said high frequency inverter battery charger frequency, thereby providing a low impedance path in short circuit relationship with said first rectifier means for high frequencies, while having substantially no filtering effect on said full wave rectified d.c. power,
high frequency transformer means having a primary winding and a secondary winding,
controllable solid state switching means electrically connected to said first and second oppositely poled terminals, and to said primary winding for providing high frequency alternating current flow in said primary, whereby voltage high frequency alternating voltage will be induced in said secondary winding,
control means responsive to selected circuit parameters for controlling the conduction of said solid state switching means, varying the ratio of conducting to non-conducting time to increase or decrease the output voltage,
second rectifier means electrically connected to said secondary winding for providing a d.c. electrical output.

20. The battery charger of claim 19 wherein said selected circuit parameters comprise the total current flowing in said primary.

21. The battery charger of claim 18 wherein said selected circuit parameters further comprise the instantaneous flux in said transformer.

22. The battery charger of claim 21 wherein said control means further includes low power d.c. supply means providing a source of substantially pure d.c. for maintaining continuous instantaneous control over said controllable solid state switching means.

23. The battery charger of claim 22 wherein said control means further includes switch means controlling the application of a.c. power to said full wave rectifier means, providing a.c. power to said full wave rectifier means only when said control means has become fully operative.

24. The battery charger of claim 19 wherein said solid state switching means comprise transistors having base, collector and emitter electrodes, said collector electrodes and said emitter electrodes operatively connected with said primary winding and with said output terminals of said full wave rectifier means to provide alternating current in said primary winding in response to control signals applied to said base electrodes.

25. The battery charger of claim 22 wherein
said primary winding comprises a center tapped winding having first and second ends, said center tap connected to one of said oppositely poled output terminals, said first end connected to the collector of one of said transistors, said second end connected to the collector of said other transistor, and said emitters connected to the other of said oppositely poled output terminals.

26. The battery charger of claim 23 wherein said solid state switching means comprise transistors having base, collector and emitter electrodes, said collector electrodes and said emitter electrodes operatively connected with said primary winding and with said output terminals of said full wave rectifier means to provide alternating current in said primary winding in response to control signals applied to said base electrodes.

27. The battery charger of claim 26 wherein said primary winding comprises a center tapped winding having first and second ends, said center tap connected to one of said oppositely poled output terminals, said first end connected to the collector of one of said transistors, said second end connected to the collector of said other transistor, and said emitters connected to the other of said oppositely poled output terminals.

28. The battery charger of claim 23 wherein said low power d.c. supply means comprises
rectifier means adapted to be connected to said source of a.c. power,
filter means for providing substantially pure d.c. power at the output thereof,
low power, high frequency inverter means including transformer means and switching means operatively associated therewith, and a plurality of secondary windings on said transformer means, providing selected high frequency a.c. output voltages,
second filter means operatively associated with said plurality of secondary windings providing selected d.c. output voltages for operation of said control means.

29. A battery charger for non-hazardous on site charging or recharging of a vehicular battery comprising,
substantially rigid, non-conductive enclosure,
high frequency inverter power supply means for contained within said enclosure for converting an a.c. electrical input to a d.c. electrical output while maintaining ohmic isolation between said input and said output, said inverter adapted to be connected to a source of low frequency single phase a.c. power and providing a substantially non-reactive load therefore,
means connecting said d.c. electrical output to said vehicular battery through apertures in said enclosure,
fan means mounted to said enclosure for providing dispersion of potentially explosive battery vapors generated during the charging process.

30. The battery charger of claim 29 wherein said d.c. electrical output is a composite waveform having low frequency component characterized by a frequency twice said low frequency single phase a.c. power source frequency, and a high frequency component characterized by a frequency twice the frequency of said high frequency inverter power supply.

31. A control and power supply module for providing output signals suitable for the operation of a high power, high frequency inverter comprising
rectifier means adapted to be connected to a source of low frequency a.c. power,
filter means electrically connected to said rectifier means for providing substantially pure d.c. at a pair of output terminals,
a switching inverter including transformer means having a primary winding and a plurality of secondary windings, and solid state switching means electrically connected to said transformer means and to said pair of output terminals,
rectifier means electrically connected to said secondary windings for providing selected d.c. output signals therefrom,
means operatively associated with said secondary windings sensing the presence of signals thereat and providing a turn-on signal to said high power, high frequency inverter when secondary signals are present.

32. The high frequency inverter battery charger of claim 19 wherein said control means further includes means responsive to the output voltage of said second rectifier means for disconnecting said first rectifier means from said a.c. power source whenever said output voltage of said secondary rectifier means exceeds a preselected value.

* * * * *